G. W. REDBURN.
DRIVING MECHANISM FOR POLISHING DEVICES.
APPLICATION FILED MAR. 4, 1912.

1,065,627.

Patented June 24, 1913.

Witnesses:

Inventor
Geo. W. Redburn

UNITED STATES PATENT OFFICE.

GEORGE W. REDBURN, OF COLLEGE PLACE, WASHINGTON.

DRIVING MECHANISM FOR POLISHING DEVICES.

1,065,627.  Specification of Letters Patent.  Patented June 24, 1913.

Application filed March 4, 1912. Serial No. 681,392.

*To all whom it may concern:*

Be it known that I, GEORGE W. REDBURN, a citizen of the United States, residing at College Place, in the county of Walla Walla and State of Washington, have invented certain new and useful Improvements in Driving Mechanism for Polishing Devices, of which the following is a specification.

My invention relates to automobile polishing or burnishing devices, the primary object being to provide an exceedingly simple, cheap, and efficient mechanical polishing or burnishing device adapted to be operated by the engine or motor of the vehicle for the purpose of polishing or burnishing the various brass and nickel plated parts of the automobile.

A further object is to provide a generally improved device for this purpose adapted to be operated in connection with the fly wheel of the crank shaft, and provided with simple mechanism whereby the same may be readily thrown into and out of operation, as well as the provision of a detachable flexible shaft adapted to carry and operate the polishing or burnishing wheel at any desired portion or part of the vehicle.

Figure 1:
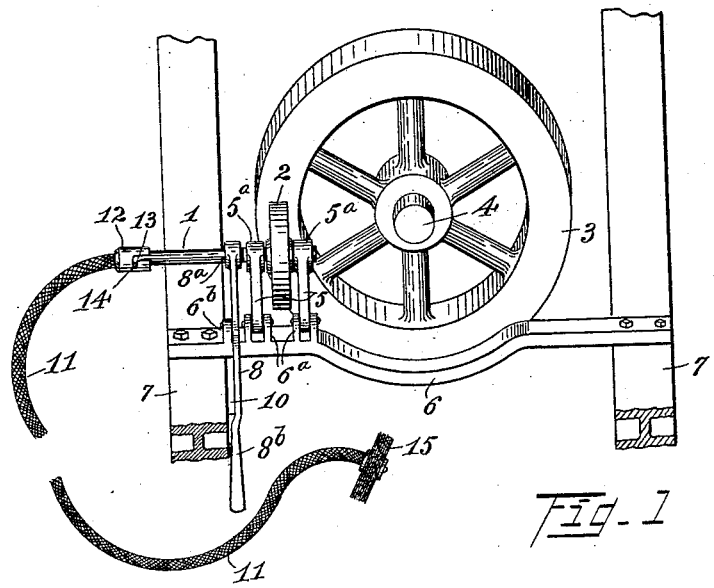
Figure 2:
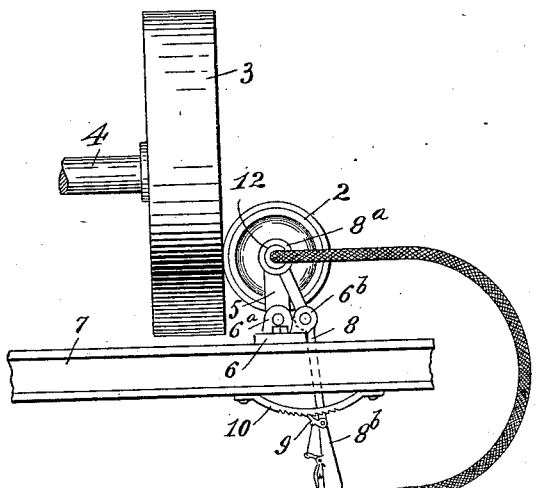

With the above mentioned and other ends in view, the invention consists in the novel construction, arrangement, and combination of parts, hereinafter described, illustrated in one of its embodiments in the accompanying drawings, and particularly pointed out in the appended claims.
Referring to the drawings forming a part of this specification, Figure 1, is an isometric view of the fly wheel of the crank shaft and side members of the vehicle frame showing my improved device applied for use. Fig. 2, a side elevation of the same.

Similar numerals of reference designate like parts throughout all the figures of the drawings.

The improved polishing or burnishing device, comprises a driving shaft 1, carrying a friction pulley or wheel 2, adapted to be thrown into and out of frictional engagement with one of the face sides of the fly wheel 3, on the crank shaft 4, of the engine or motor of the vehicle.

As a means for movably mounting and supporting the driving shaft 1, whereby the friction pulley or wheel 2, may be thrown into and out of operative engagement with
the fly wheel 3, said driving shaft is mov-
ably mounted and supported in a pair of movable bearing arms 5, and as a means for supporting and attaching the arms 5, a cross supporting arm or member 6, may be secured to the side members 7, of the automobile frame in suitable proximity to the fly wheel 3, said cross member 6, being provided, in the present instance, with bearing lugs 6$^a$, adapted to pivotally contain and support the bearing arms 5, the upper or free ends of the latter being provided with bearing heads 5$^a$ for the reception of the driving shaft 1.

As a means for operating the driving shaft 1, and bearing arms 5, as well as securing the driving shaft 1, and pulley 2, in any desired adjusted position in frictional contact with the fly wheel 3, an operating lever 8, is provided, said operating lever, in the present instance, being pivotally secured to a bearing lug 6$^b$, of the cross arm 6, and, in the present instance, having a bearing head 8$^a$, for the driving shaft 1, said operating lever having a handle portion 8$^b$, extending beneath the adjacent side member 7, of the vehicle frame and provided with suitable adjusting or latching mechanism, as for example, an ordinary pivoted pawl or latch member 9, adapted to be thrown into and out of engagement with a rack member 10, secured to the adjacent side member 7, of the vehicle frame, whereby the friction pulley may be secured in fixed frictional engagement with the fly wheel 3, during the operation of the burnishing or polishing wheel.

The flexible shaft 11, may be of any suitable and convenient form or type and is detachably connected to the outer end of the driving shaft 1, by means of a coupling sleeve or head 12, provided with an L-shaped slot 13, adapted to receive and take over a cross pin 14, in the end of the shaft 1. The outer or free end of the flexible shaft 11, is provided with a polishing or burnishing wheel 15, of any suitable and convenient form or type, said polishing or burnishing wheel being preferably detachably connected to the end of the flexible shaft 11, whereby burnishing wheels of varying material or character may be substituted as desired.

From the foregoing description, taken in connection with the accompanying drawings, the operation and advantages of my invention will be readily understood.

Having thus described one of the embodiments of my invention, what I claim and desire to secure by Letters Patent is,—

1. A driving mechanism for an automobile polishing device, comprising frame side members, a cross supporting member provided with bearing lugs, bearing arms pivotally mounted in said bearing lugs, a driving shaft mounted at the free ends of said bearing arms and extending above one of said frame side members, a friction pulley on said driving shaft between said bearing arms, an operating lever similarly mounted and connected to said cross supporting member and said driving shaft whereby the latter and said bearing arms may be simultaneously moved, and adjusting mechanism for securing said operating lever in any desired adjusted position.

2. In a driving mechanism for an automobile polishing device, the combination with the fly wheel and the side members of the frame of an automobile; of a cross supporting member connected to said side members, bearing arms pivotally mounted and supported on said cross supporting member, a driving shaft mounted at the free ends of said bearing arms, a friction pulley carried by said shaft between said bearing arms and adapted to be thrown into and out of frictional engagement with said fly wheel, an operating lever pivotally mounted on said cross supporting member and connected to said driving shaft whereby the latter and said bearing arms may be moved to throw said friction pulley into and out of engagement with said fly wheel, said operating lever extending beneath and adjacent to one of said side members, and adjusting mechanism connected to said lever and said adjacent side member.

In testimony whereof I have affixed my signature in presence of two witnesses.

GEORGE W. REDBURN.

Witnesses:
LEWIS S. MOYER,
ELMER G. WATSON.